May 29, 1923.
A. W. SCHOOF
1,456,938
INSTRUMENT FOR TESTING AND COMPARING THE LEAD OF A SCREW THREAD
Filed Oct. 7, 1921
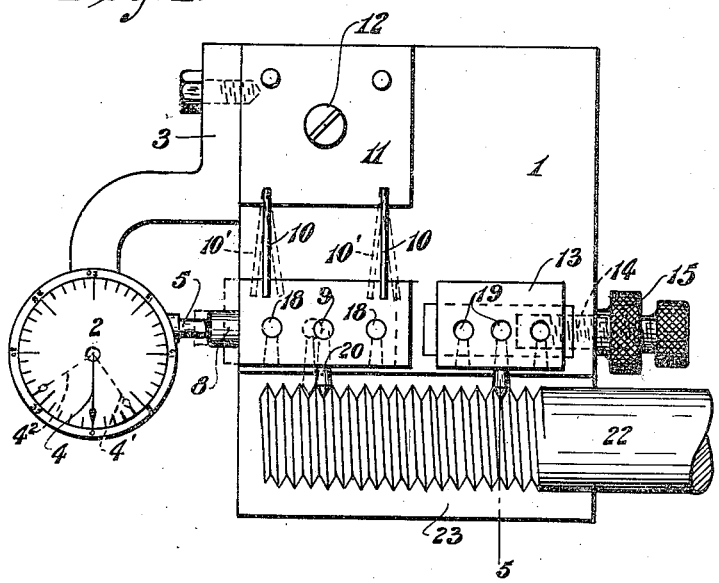
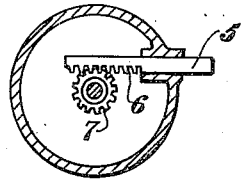
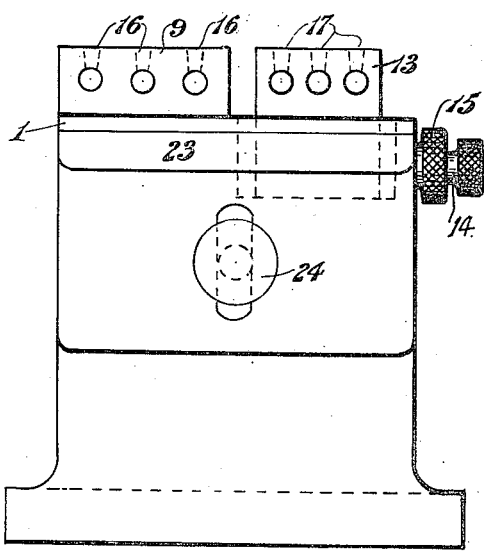
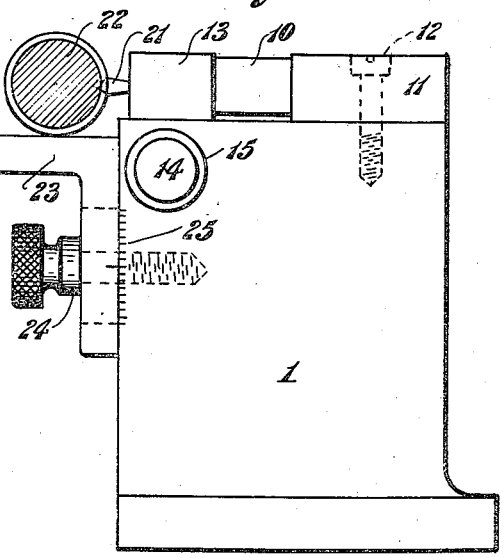
INVENTOR,
A. W. Schoof,
BY
Harry W. Bowen.
ATTORNEY.

Patented May 29, 1923.

1,456,938

UNITED STATES PATENT OFFICE.

ARTHUR W. SCHOOF, OF GREENFIELD, MASSACHUSETTS.

INSTRUMENT FOR TESTING AND COMPARING THE LEAD OF A SCREW THREAD.

Application filed October 7, 1921. Serial No. 506,074.

*To all whom it may concern:*

Be it known that I, ARTHUR W. SCHOOF, a citizen of the United States of America, residing at Greenfield, in the county of Franklin and Commonwealth of Massachusetts, have invented certain new and useful Improvements in an Instrument for Testing and Comparing the Lead of a Screw Thread, and of which the following is a specification.

This invention relates to measuring instruments, or gauges, and is particularly designed for comparing the lead of a screw thread with a standard thread, the lead of which has been accurately determined. It is a well known fact in the operation of cutting a screw thread that its lead may vary from the lead of a standard thread due to various causes, among which is inaccuracy in the adjustment of the parts of the thread cutting apparatus. It is sometimes due to the uneven texture of the material on which the thread is being cut, the result being that the finished thread does not accurately fit an engaging nut permitting the same to work loose or it may exert an unreliable pressure on the parts that are being bolted together.

The "lead" of a thread is the distance a nut will advance or travel when it is screwed a given number of turns on a bolt, or the like, the distance being usually a standard one as a half-inch, inch, or inch and a half, for example.

Broadly considered, the invention comprises a fixed and a freely movable or floating block or member that are connected together by means of thin elastic members which are capable of automatically returning the floating block to precisely its original position. In other words, any movement of the floating member will be so controlled that no "lost motion" can take place which would prevent its return movement to a position which is exactly the same as its original one and during a long series of movements that are induced by exactly the same pressure. Lost motion such as is liable to occur in pivoted or sliding constructions, or mechanisms, is the principal feature which this method of suspension of the floating member in the instrument is designed to overcome in the instrument itself. Stated another way, any inherent tendency towards "lost motion" which may be in the indicator itself will not be aggravated by lost motion in the present method of suspension of the floating member. The floating or movable block is so constructed and arranged as to operate an indicating instrument, the pointer of which preferably indicates thousandths, or decimal parts, of a thousandth of an inch. In use, a standard thread is first placed on the instrument and the position of the pointer is noted on the indicator thereon. This thread is then removed and one, the lead of which is to be measured or compared, is placed on the instrument and the second position of the pointer is noted. The difference, if any, will be the lead error. The important feature of the instrument is the lack of any movable parts which can, in any way, produce or cause lost motion. This is accomplished by means of the two afore mentioned thin elastic members 10 which are connected to the fixed and movable members 9 and 11. These members operate in unison and not in opposition to each other. Means are provided for comparing threads of different diameters and for different distances or lengths if desired, means are also provided for setting the thread supporting platform at different elevations for corresponding with the diameters of threads under examination.

Referring to the drawings:

Fig. 1 is a plan view of the complete device showing the fixed, and movable or floating blocks or members that are connected together with thin elastic strips, also the pointed or other suitably shaped rests which engage the thread, and a threaded member, in place for examination.

Fig. 2 is a front elevational view of Fig. 1 with the threaded member removed and showing the openings for receiving the pointed rests.

Fig. 3 is an end elevational view of Fig. 1 looking from the right and illustrating the adjustable rest for receiving the threaded member whose lead is under examination, and Fig. 4 is a detail view, in section, of the registering or measuring instrument of any suitable or approved design.

Referring now to the drawings in detail:

1 designates the base portion of the instrument, 2 a graduated device for indicating or measuring thousandths or any small decimal parts of an inch that is attached to the base 1 by means of the bracket 3. This device is provided with a movable pointer 4 which is operated by the slidable pin, 5, which pin, is formed with a rack indicated at 6 that meshes with a gear 7 and which operates the staff to which the pointer 4 is connected. Any other suitable pointer operating mechanism other than the rack and pinion may be used, as a worm with a long lead. Engaging the end of the pin 5 is a projection or pin 8, that is secured to the floating or freely movable block or member 9 which block is connected by means of the thin elastic strips 10 to the block or member 11 which is firmly fixed to the base piece 1 in any suitable manner as by means of the screw 12. These strips are composed of suitably thin elastic metal such as brass, bronze or steel would be used. Located adjacent to the floating block 9 is another block 13 which is capable of lateral adjustment by means of the adjusting screw 14 and retained in place by means of the lock nut 15. Formed in the forward sides of the blocks 9 and 13 are the tapered openings 16 and 17 and communicating with the openings 16 and 17 are the vertically arranged openings 18 and 19. The openings 16 and 17 are for the purpose of receiving the hardened pointed anvils or rests 20 and 21 which are formed to enter the grooves between the threads of the threaded member indicated at 22, the lead of which is under examination. The pointed anvil 21 is shown in Fig. 3 as entering the thread of the member 22 which is indicated in section at this point by the line 5—5 of Fig. 1. 23 indicates a platform for receiving the member 22. This platform is adjustably secured to the base part 1 by means of the thumb screw 24. Graduation marks 25 may be placed on the base 1 for indicating the different diameters of threaded members 22, and to which the platform 23 may be raised or lowered into different elevations as required. In forming the openings 16 and 17 with a taper which receive the pointed rests 20 and 21 it will permit the ready removal of these rests. By inserting a driving element in these openings it would engage the inner ends of the rests and readily loosen them or drive them out of the holes 16 and 17. The operation of the instrument may be described.

A standard threaded member, as a gauge, indicated at 22, is placed on the platform 23 and moved against the rests 20 and 21. Since the rest 21 is fixed, and the rest 20 is carried by the floating or slidable block 9 it will automatically seat itself on the sides of the thread on the gauge and, at the same time cause the block 9 to move on the base portion 1 in either direction by slightly bending the thin elastic strips 10 into the dotted line portions 10' causing the pointer 4 to move into say, the dotted line portion 4' and indicating a reading of 4/1000 of an inch. This reading is carefully noted and the standard thread gauge 22 is removed and the one that is to have its lead compared with the same is now substituted. The same operation is repeated and a second reading of the pointer say $4^2$ is carefully noted. This is indicated in thousandths of an inch. The difference in the readings from one position to the other can now be computed.

It is understood that the distance between the pin rests is a fixed one, say 1½ inches.

The instrument may, of course, be used by placing the standard threaded gauge on the platform 23, then moving it against the pin rests, and by means of the screw 14 adjusting the pointer 4 to first come to its zero position then the reading 4' would give the reading of the substituted thread directly in thousandths. The important feature of my invention is the suspension of the floating block 9 by means of the thin elastic strips 10 from block 11 and by means of which it will always return to its exact original position without any lost motion or back lash of any kind even after a series of movements induced by the same pressure.

The strips 10 are necessarily secured at their ends in kerfs or grooves in the blocks 9 and 11. The instrument 2 is of any approved pattern and does not form a part of the present invention.

The term "rests" is used herein for designating the hardened elements which seat themselves in the thread grooves. It is to be understood that applicant is not limited to the use of this term as other terms may be used such as "anvils" or "bearing elements" as desired.

It is, of course, obvious that when the lead of a thread is to be measured the member, as 22, is forced or moved against the rests or anvils 20 and 21 with sufficient pressure to secure a positive seat. This movement will, of course, produce a lateral pressure on the anvil 20 causing it to move the floating member 9.

The rests or anvils may be formed of spherical form, if desired.

What I claim is:

1. In an instrument for testing and comparing the lead of screw threads, the combination with a base piece, of a receiving member for the thread to be compared, a device for receiving a thread engaging member, said device being adjustable for positioning said member, a second device also carrying a thread engaging member, thin elastic strip devices for permitting the said second device to have a freely floating movement in either direction, and means operated by the floating device for indicating the amount of movement of the second device.

2. In a device for comparing the lead of screw threads, the combination, of an adjustable and a freely movable member, means carried by the members for engaging threads, thin elastic strip means attached to the freely movable member for permitting this movable member to automatically return to its normal or original position after being moved therefrom by the thread being measured and means operated by the freely movable member for indicating the travel or extent of movement of the said freely movable member.

3. In a device of the kind described, the combination of a floating member, a thread engaging rest carried thereby, means for connecting the member to a fixed support, said means including a pair of parallelly arranged thin elastic members extending between the support and said floating member and always operating together in the same direction.

4. In a device of the kind described, the combination of a floating member carrying a screw thread engaging point, a fixed member, and means connecting the members comprising a plurality of thin elastic elements all of which are normally not under stress, whereby the floating member will return to its original position when the elastic elements are flexed and released from their normal position.

5. In an instrument for testing the lead of a screw thread, the combination, of a freely movable member, an adjustable member, said members having rest devices for entering the grooves between the threads and in spaced relation that may be definitely varied by the adjustable member, the freely movable member being attached to a fixed member by means of parallelly arranged thin elastic elements, and a measuring device operable from the movable member, the elastic elements causing the movable member to return to its original position when the threaded member is removed from the rest device.

6. In an instrument for measuring the lead of a screw thread, in combination, a supporting member, an adjustable bracket secured thereto for receiving the threaded members of different diameters to be measured, a second member on the supporting member to receive a thread engaging member, means for adjusting the second member, a third member on the supporting member to receive a second thread engaging member, means to permit the third member have a free floating movement in either direction when its thread engaging member enters the thread of the screw thread to be measured, said means including a thin elastic member, and an indicating device operated by the floating member.

ARTHUR W. SCHOOF.